United States Patent
Lo et al.

(10) Patent No.: US 9,462,648 B2
(45) Date of Patent: Oct. 4, 2016

(54) METHOD AND ARRANGEMENT FOR REMOTELY DRIVING LIGHT EMITTING DIODES FROM A THREE-PHASE POWER SOURCE VIA A SINGLE PHASE CABLE SYSTEM

(71) Applicant: Huizhou Light Engine Limited, Huizhou (CN)

(72) Inventors: Chung Ping Kevin Lo, Hong Kong (CN); Wa Hing Leung, Hong Kong (CN); Kam Wah Siu, Hong Kong (CN)

(73) Assignee: Huizhou Light Engine Limited, Huizhou (CN)

( * ) Notice: Subject to any disclaimer, the term of this patent is extended or adjusted under 35 U.S.C. 154(b) by 0 days.

(21) Appl. No.: 14/518,239

(22) Filed: Oct. 20, 2014

(65) Prior Publication Data
US 2016/0113083 A1    Apr. 21, 2016

(51) Int. Cl.
*H05B 33/08*    (2006.01)
(52) U.S. Cl.
CPC ...... *H05B 33/0845* (2013.01); *H05B 33/0815* (2013.01)
(58) Field of Classification Search
CPC ................ H05B 33/0845; H05B 33/0815
USPC ........................................................ 315/186
See application file for complete search history.

(56) References Cited

U.S. PATENT DOCUMENTS

| | | | | |
|---|---|---|---|---|
| 7,081,722 B1* | 7/2006 | Huynh | ............... | H05B 33/0818 315/185 S |
| 8,686,651 B2* | 4/2014 | Lynch | ............... | H05B 33/0818 315/192 |
| 8,901,849 B2* | 12/2014 | Jeong | .................. | H05B 33/083 315/122 |
| 9,210,757 B2* | 12/2015 | Tao | ..................... | H05B 33/0815 |
| 9,301,353 B2* | 3/2016 | Park | ................... | H05B 33/0815 |
| 2013/0234611 A1* | 9/2013 | Lee | ....................... | H05B 33/083 315/192 |

(Continued)

FOREIGN PATENT DOCUMENTS

| CN | 102186282 A | 9/2011 |
|---|---|---|
| CN | 202190446 U | 4/2012 |
| CN | 103731964 A | 4/2014 |

(Continued)

OTHER PUBLICATIONS

Office Action dated Aug. 10, 2015 for Chinese Patent Application No. 201510086856.X (with English translation).
Search Report dated Mar. 5, 2015 for Chinese Patent Application No. 201510086856.X (with English translation).

*Primary Examiner* — Dylan White
(74) *Attorney, Agent, or Firm* — Schiff Hardin LLP

(57) ABSTRACT

Multiple LEDs connected in series are driven by DC voltage that is provided by a diode rectifier connected to a three-phase power source. In order to reduce ripple in the DC voltage, the series-connected LEDs can be divided into a first set and a second set, and a first constant current source is provided that drives the first set, and a second constant current source is provided that drives the second set. The first and second constant current sources are both connected across the outputs of the rectifier circuit, and operate to drive the respective sets of light emitting diodes in alternation. The capability for dimming can be provided, as well as back-up single phase operation. The light emitting diodes can be situated remote from said rectifier and connected thereto by a single phase power transmission system, formed by only two wires.

15 Claims, 10 Drawing Sheets

(56) References Cited

U.S. PATENT DOCUMENTS

2015/0054408 A1\* 2/2015 Wlodarczyk ...... H05B 33/0809
 315/137
2015/0084516 A1\* 3/2015 Chu ................... H05B 33/0812
 315/140

FOREIGN PATENT DOCUMENTS

| CN | 203645897 U | | 6/2014 |
|---|---|---|---|
| CN | 204392662 U | | 6/2015 |
| JP | 2011077009 A | \* | 4/2011 |
| JP | 2011077009 A | | 4/2011 |

\* cited by examiner

METHOD AND ARRANGEMENT FOR REMOTELY DRIVING LIGHT EMITTING DIODES FROM A THREE-PHASE POWER SOURCE VIA A SINGLE PHASE CABLE SYSTEM

TECHNICAL FIELD OF THE INVENTION

The present invention relates to driving circuitry and driving methods for operating light emitting diodes (LEDs).

BACKGROUND OF THE INVENTION

Typically, the use of LEDs as an AC powered light source requires a driver to convert AC line power to a regulated DC power for maintaining constant light output. Such an LED driver is a self-contained power supply that has output matched to the electrical characteristics, such as forward voltage and driving current, of the LED. Usually, the driver is built on an individual PCB and connects to an LED PCB which contains the array of LEDs.

FIG. 1 shows typical circuitry of an AC-DC LED driver using the known flyback converter topology. The circuitry 10 includes an AC power source 12 with live (L) and neutral (N) terminals, and a rectifier circuit 14 that converts the AC, e.g., sinusoidal, input waveform to a DC waveform, e.g., a half wave rectified waveform. The circuit operates such that when the switch Q1 conducts, current is directly drawn from the rectified sinusoid. Energy is stored in the magnetizing inductance of the primary winding of transformer T1. The rectifying diode D1 is reverse biased and the LED current is supplied by the secondary capacitor Cout. When Q1 turns off, diode D1 conducts and the stored energy is delivered to the secondary winding of transformer T1 and to the output. The controller chip U1, which can be, for example an iW3620 Digital PWM Constant Current Controller for AC/DC LED Driver, manufactured by iWatt, Inc., regulates the LED current by comparing the information about the secondary output voltage and LED current, which information is reflected via the auxiliary winding of transformer T1, to a constant reference and, based on the comparison, adjusting the duty cycle of switch Q1.

AC-DC drivers such as the one shown in FIG. 1 are complex and bulky circuits. Proper electromagnetic interference filter design is needed to suppress conducted interference that is generated by the driver or by other equipment. The lifetime of such circuits is usually limited by the electrolytic capacitors used in such circuits.

On the other hand, LED lighting products have recently been developed in which a number of series-connected LEDs are operated with built-in LED driving circuitry that can operate from an AC power source directly. The built-in driving circuitry has an AC input connection that is configured for being received in a standard AC outlet. A disadvantage of such products, however, is that the AC line voltage is sinusodal, and low-frequency AC LED systems conventionally operate in a rectified mode, that causes the AC-driven LED to be turned off and on at a rate that is double the line frequency. FIG. 2A schematically illustrates such a known AC-driven LED. In this known circuit, a bridge rectifier BR1 converts the AC output from a power source V1 to a pulsating DC voltage, which forward biases a string S1 of series-connected LEDs, causing all of the LEDs in the string S1 to conduct, and thus emit light. A resistor R1 limits the current through the LED string S1.

FIG. 2B shows the light output of such an AC-driven LED. It can be seen that the overall off-time is approximately 40%. This percentage or off-time may, under some circumstances, be noticed by an observer as a flicker and can be a drawback to the acceptability of LED lighting by certain consumers.

SUMMARY OF THE INVENTION

An object of the present invention is to provide an LED lighting system and driving circuitry therein that overcome the aforementioned disadvantages of AC-driven LED lighting.

This object is achieved in accordance with the present invention by providing a driving circuit for a string of series-connected LEDs, with the driving circuit having inputs connectable to a three-phase power source. The LED lighting system according to the Invention, therefore, constitutes three-phase-driven LED lighting.

To further improve regulation and efficiency of such three-phase-driven LED lighting, in a preferred embodiment the driving circuitry embodies commutating constant current sources.

The use of such commutating constant current sources for driving LEDs in a series-connected string minimizes the ripple in the drive voltage that is "seen" by the LEDs, thereby reducing the off-time and causing no notable flicker in the emitted light. Compared to conventional power supplies, the size of such three-phase power supply can be much smaller. There is no electromagnetic interference filter in the circuit. Reliability will be higher since no electrolytic capacitor is used in the circuit. The circuit is more environmental-friendly because significantly fewer components are used. The circuit is especially cost effective for high wattage power supplies us used in public urea lighting, warehouses, agriculture, etc.

Rather than providing the rectifier circuit and the drive circuitry on a single printed circuit board, in accordance with the Invention the rectifier circuit is situated remotely from the LEDs that are powered thereby. The rectifier circuit produces a DC ripple current, which is supplied to the LEDs via two-wire cable system, i.e., a single phase transmission system. Therefore, the site or sites at which the driven LEDs are situated does not itself have to be equipped with a three cable system in order to provide three-phase power to that site or those sites. Only the rectifier circuit needs to be connected to the three-phase power source, and the LEDs are connected to the rectifier circuit via a standard two-wire, single phase transmission system.

In an aspect of the present invention, light emitting diode (LED) drive circuitry comprises a rectifier comprising three inputs adapted for connection to a three-phase power source to respectively receive three-phase currents from said three-phase power source; said rectifier comprising a plurality of diodes connected to rectify said three-phase currents to produce a DC voltage across two outputs of said rectifier, a single phase power transmission system consisting of two wires, respectively connected to said two outputs of said rectifier; and a plurality of LEDs connected in series across said two wires at at least one location situated remote from said rectifier, and driven by said DC voltage produced by said rectifier at said two outputs, and being physically separated from said rectifier by said transmission system at said at least one location remote from said rectifier.

In a further aspect of the present invention, the plurality of LEDs comprises a plurality of sets of LEDs, with the LEDs in each set being connected in series, and the respective sets of LEDs are each individually connected across the two wires of the single phase power transmission system, at respectively different, separated remote locations from the rectifier.

In a further aspect of the present invention, a method for driving light emitting diodes (LEDs), comprises connecting three inputs of a rectifier to a three-phase power source to respectively receive three-phase currents at said three inputs from said three-phase power source; in said rectifier, rectifying said three-phase currents to produce a DC voltage across two outputs of said rectifier; connecting a single-phase power transmission system, consisting of two wires, to said two outputs of said rectifier; and connecting a plurality of LEDs in series across said two wires of said single-phase power transmission system at at least one location that is remote from said rectifier, and driving said LEDs at said at least one location with said DC voltage produced by said rectifier, with said LEDs being physically separated from said rectifier by said single phase power transmission system.

A further aspect of the method of the present invention includes dividing the plurality of LEDs into a plurality of sets of LEDs, with each set of LEDs comprising a plurality of LEDs connected in series, and connecting each set of LEDs individually across the two wires of the single phase power transmission system, at respectively different, separated remote locations from said rectifier.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

Figure 1:
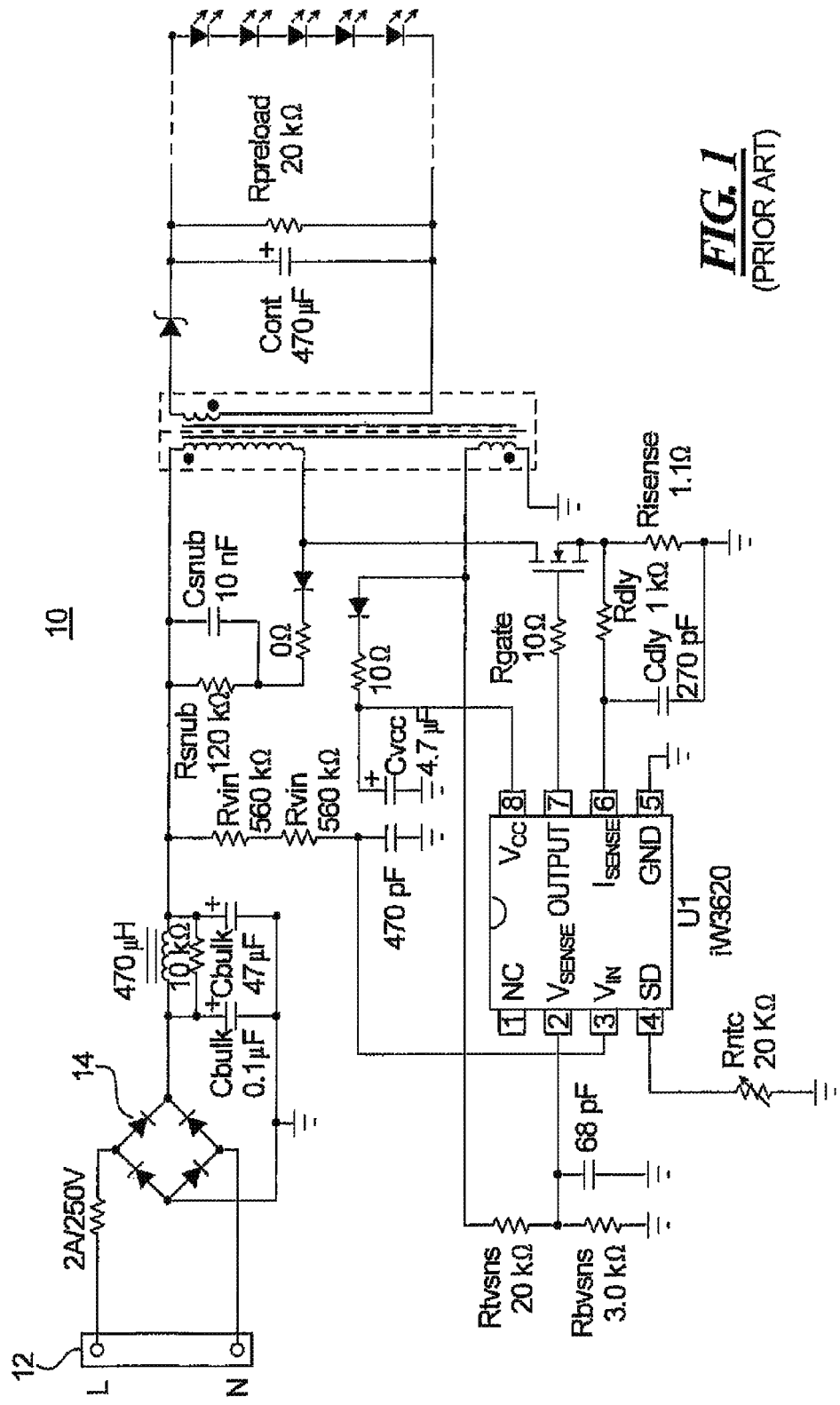
FIG. 1, as noted above, is a circuit diagram of conventional AC-DC LED driver.
Figure 2A:
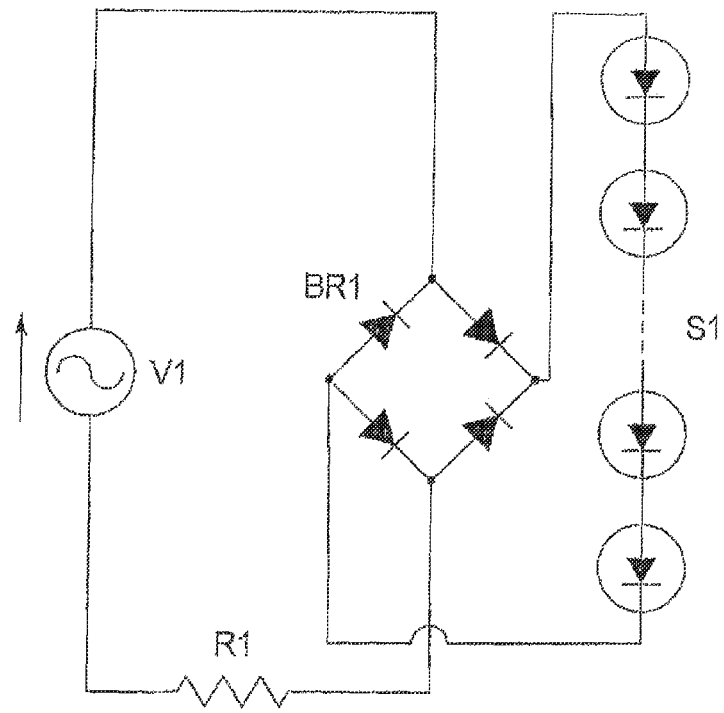
FIG. 2A, as noted above, is a circuit diagram of conventional AC-driven LED lighting.
Figure 2B:
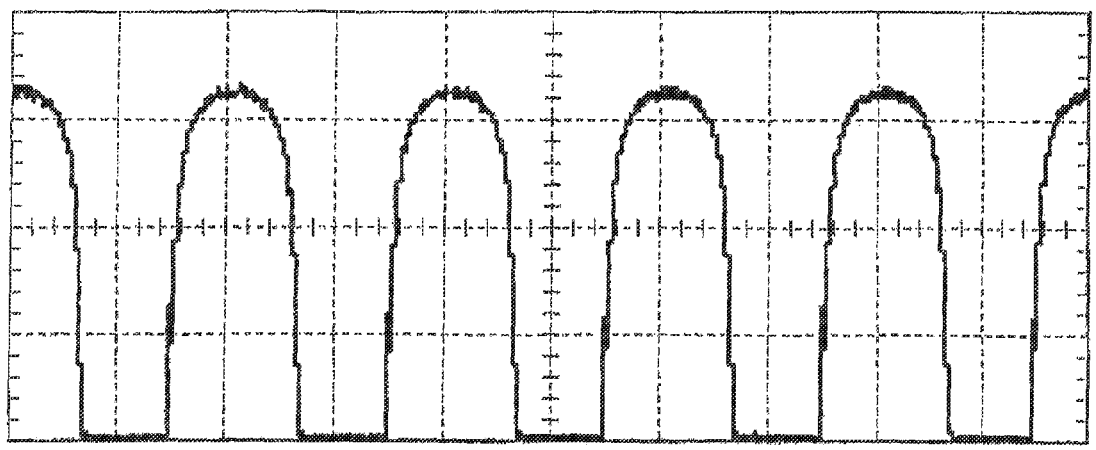
FIG. 2B, as noted above, shows the light output waveform of AC-driven LED lighting as shown in FIG. 2A.
Figure 3:
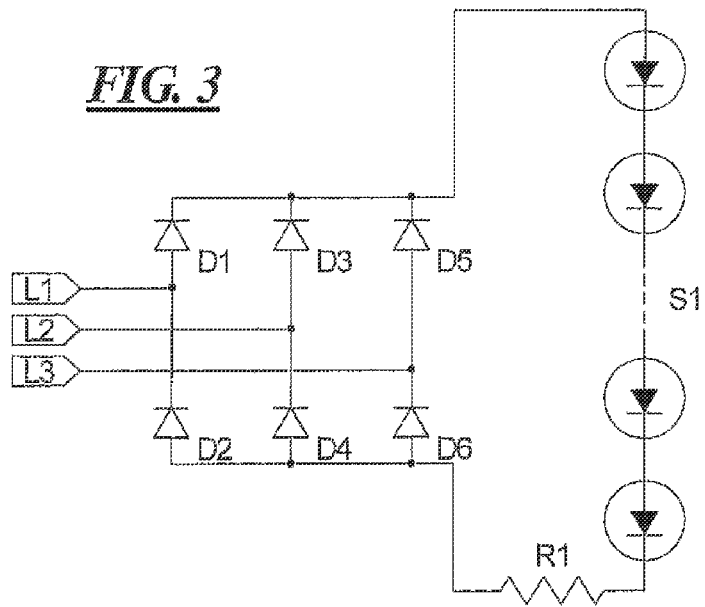
FIG. 3 is a circuit diagram of three-phase-driven LED lighting in accordance with the present invention.

FIG. 3 is a circuit diagram of a first embodiment of three-phase LED driving circuitry in accordance with the present invention. Diodes D1 through D6 form a three-phase rectifier, connected to inputs at which the three phases L1, L2 and L3 from a three-phase power source are supplied to the driving circuitry. The three-phase rectifier formed by the diodes D1 through D6 converts in the incoming signals L1, L2, and L3 into a DC voltage, which is applied across a string S1 of light emitting diodes. A resistor R1 limits the current through the LED string S1.

Figure 4:
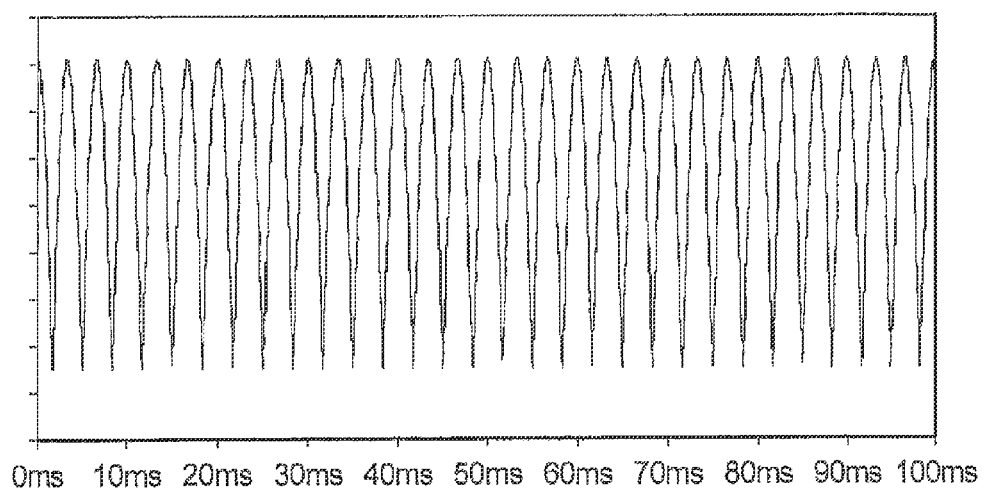
FIG. 4 shows the light output waveform of the three-phase-driven LED lighting of FIG. 3.

The light output from the LEDs in FIG. 3 is shown as a waveform in FIG. 4. As can be seen from FIG. 4, there is no off-time. Instead, them is a ripple at a rate of six times the line frequency. In most countries, this flicker is at 300 or 360 Hz, which theoretically cannot be perceived. The efficiency of the circuit shown in FIG. 3 is approximately 85%. Because only the resistor R1 is used to limit the current to the LED string S1, however, line voltage variations may cause the light output to change.

Figure 5:
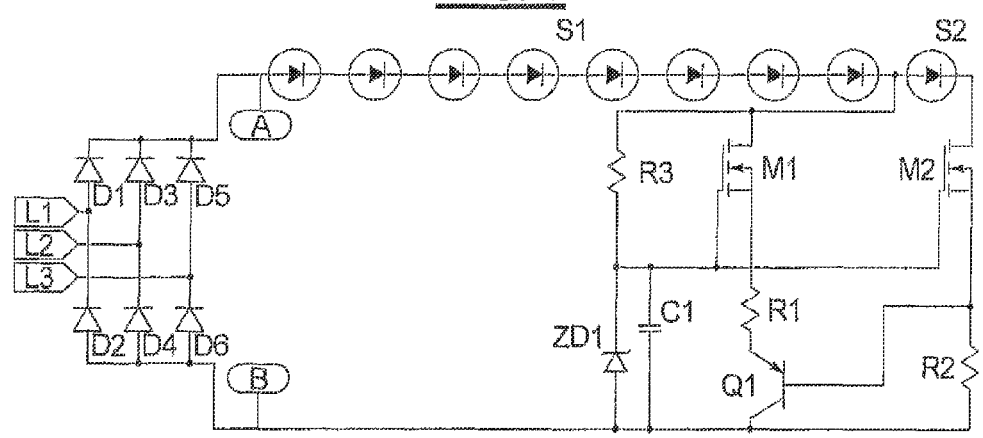
FIG. 5 is a circuit diagram of an embodiment of the invention wherein the driving circuitry includes commutating constant current sources.

In order to improve efficiency and current regulation, in a further embodiment of the driving circuitry according to the invention shown in FIG. 5, the driven LED string is divided into two sub-strings, with a forward voltage ratio of 8:1, and two constant current sources are provided to respectively drive the LED sub-strings.

Figure 6:
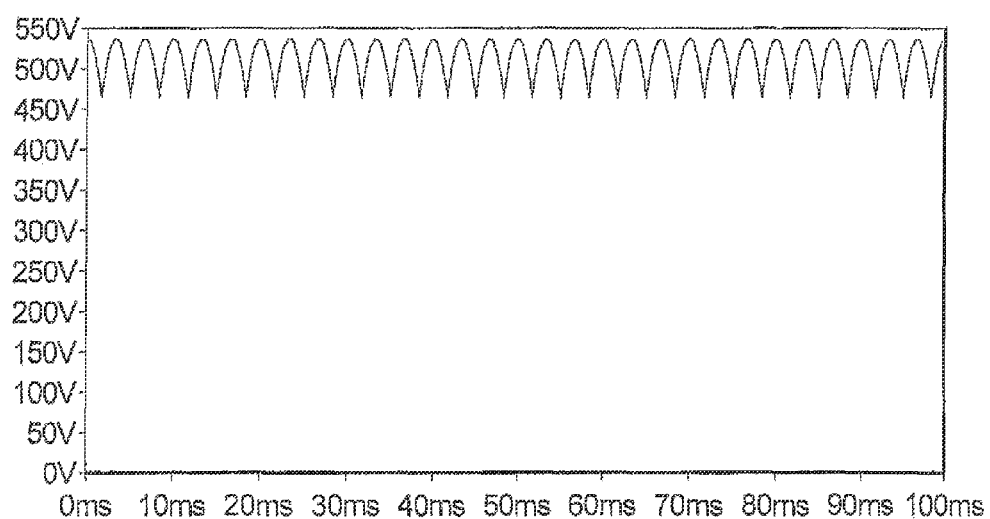
FIG. 6 shows the rectified three-phase voltage waveform used to operate the circuit shown in FIG. 5.

The driving circuitry shown in FIG. 5 also has a rectifier formed by diodes D1 through D6, connected to a three-phase source from which inputs L1, L2 and L3 are provided. Assuming that the three-phase source is a 380 V three-phase power source, the rectified three-phase voltage waveform across A and B of FIG. 5 is shown in FIG. 6.

Figure 7:
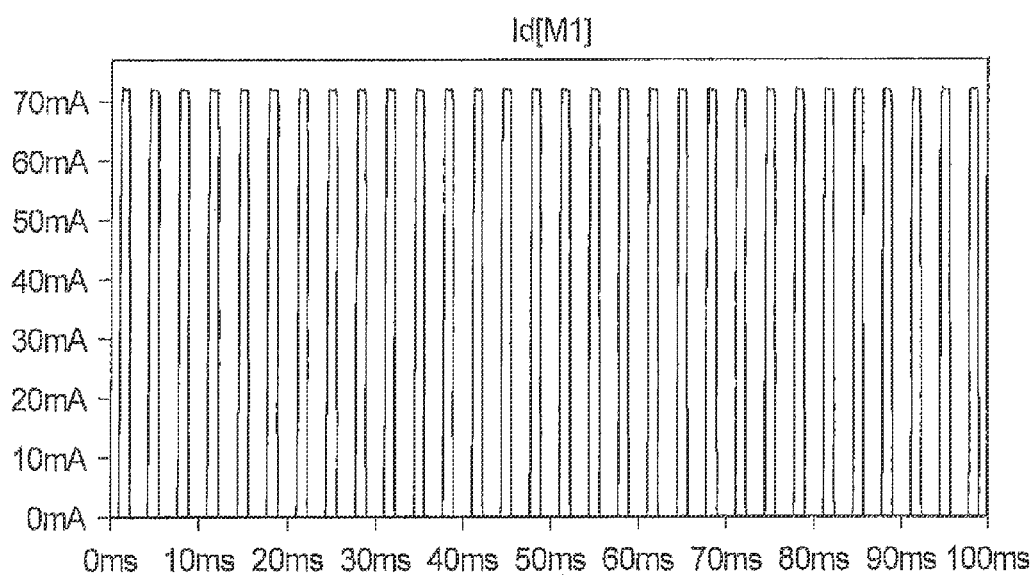
FIG. 7 shows the current waveform of a first of the two constant current sources shown in the circuit of FIG. 5.
Figure 8:
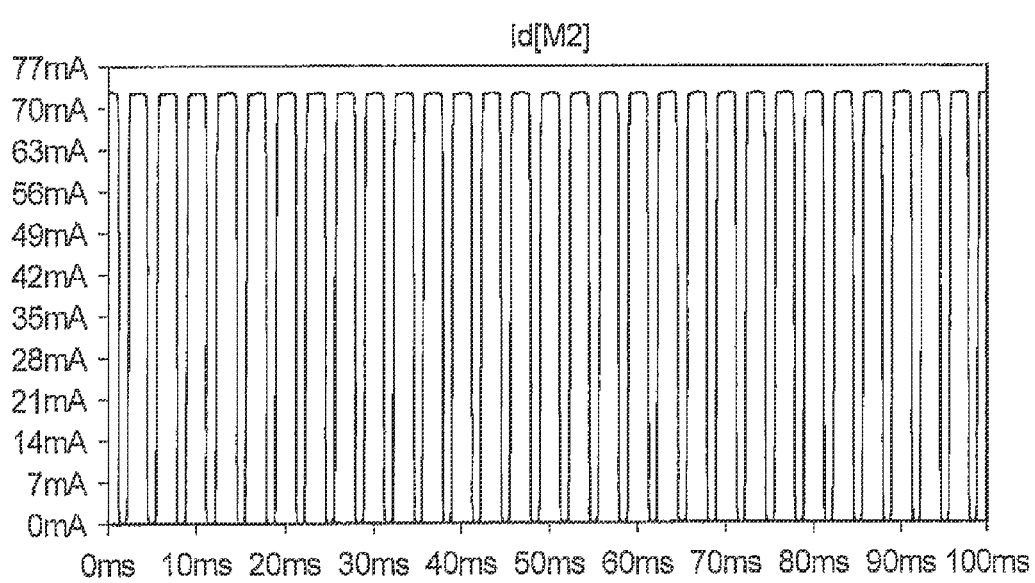
FIG. 8 shows the current waveform of a second of the two constant current sources shown in the circuit of FIG. 5.

The LED string S1 in the embodiment of FIG. 5 is formed by eight series-connected LEDs, with a forward voltage of 50 V each. A resistor R3, and Zener diode ZD1 and a capacitor C1 form a constant voltage source that biases the respective gates of field effect transistors M1 and M2. A current source formed by the transistor M1, the resistor R1, and a bipolar transistor Q1 is used to drive the LED string S1. When the voltage across A and B rises above 500 V, the additional LED string S2, which includes a single 50 V LED, begins to conduct through another current source that is formed by the transistor M2 and a resistor R2. As the voltage across A and B further increases, current through M2 reaches the regulated value, and the transistor M1 is turned off by the transistor Q1. FIGS. 7 and 8 show the current waveforms of the transistors M1 and M2, respectively. It should be noted that transistors M1 and M2 conduct in alternation according to the voltage change across A and B, thereby minimizing power loss. At low voltage, only the LED string S1 is conducting. At high voltage, both LED strings S1 and S2 are conducting.

Figure 9:
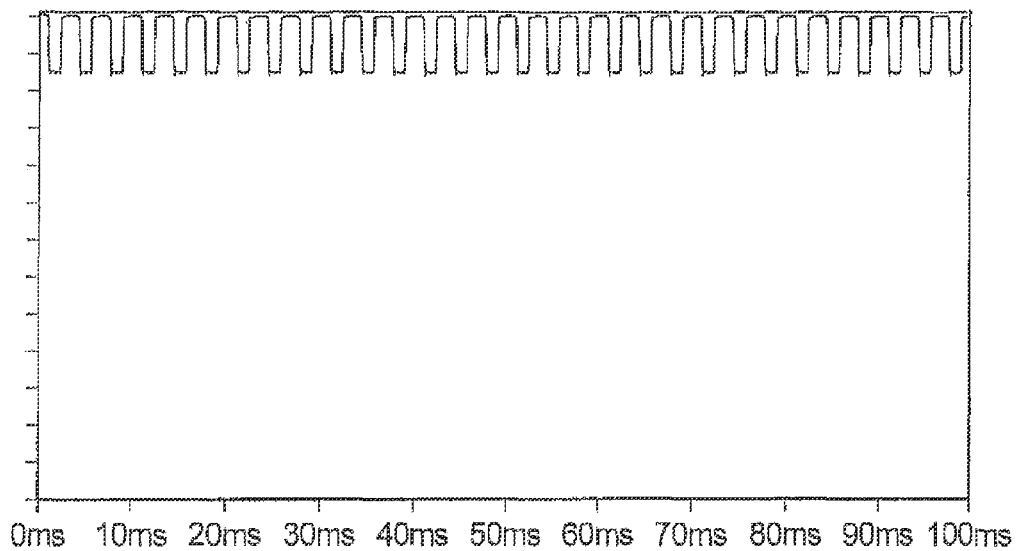
FIG. 9 shows the light output waveform of the LED string in the circuit of FIG. 5.

FIG. 9 shows the light output of the embodiment shown in FIG. 5. Compared to the light output of the embodiment of FIG. 3, which is shown in FIG. 4, it can be seen in FIG. 9 that the ripple is minimized to less than 8%. The efficiency is also improved to 95%.

Figure 10:
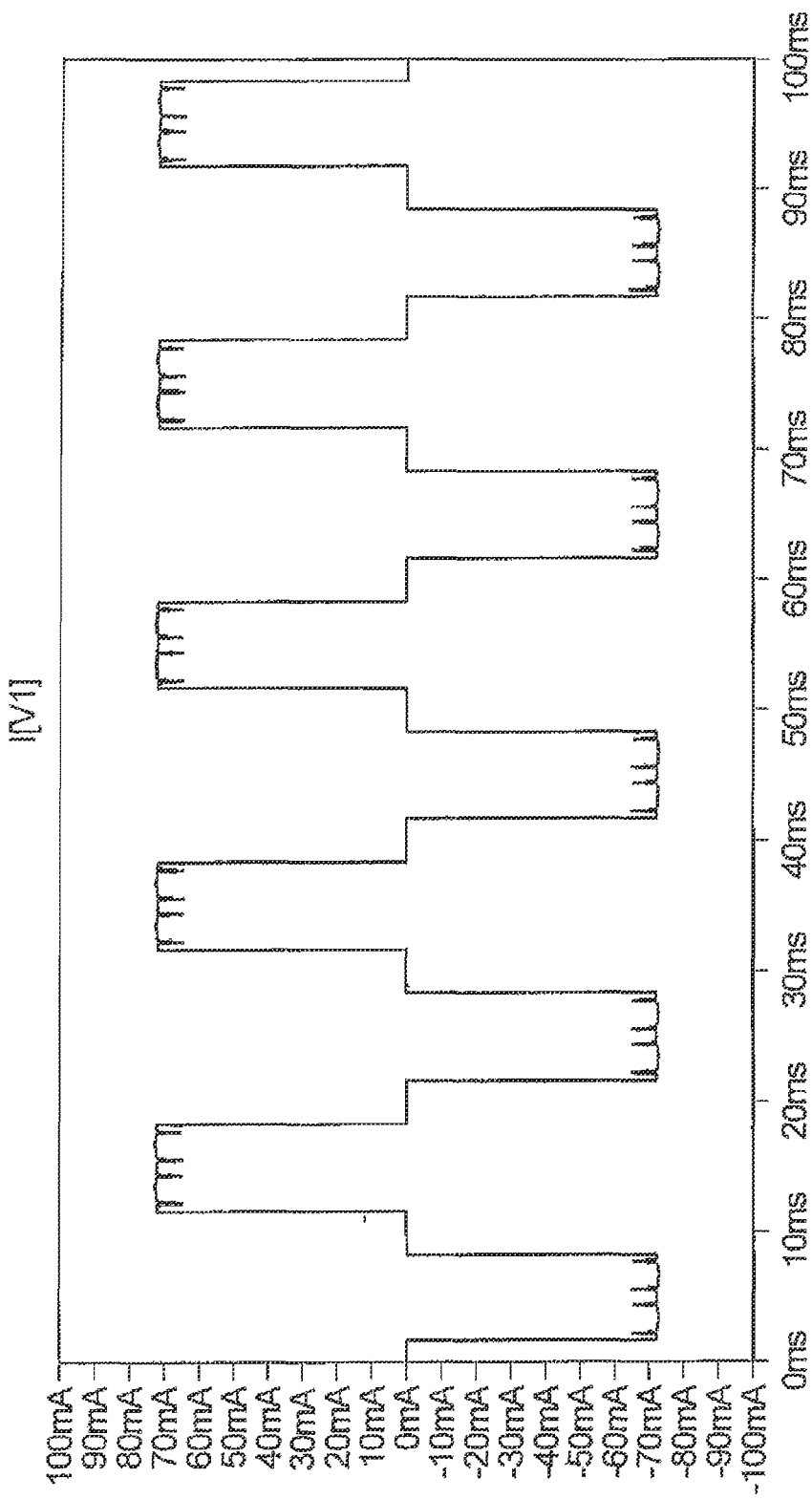
FIG. 10 shows the input current waveform of the phase L1 supplied to the circuit shown in FIG. 5.

FIG. 10 shows the input current waveform of L1. The other phases L2 and L3 will have the same waveform, but will be offset with respect to phase. With such input current waveforms, the power factor of the embodiment shown in FIG. 5 has a typical value of 0.95.

Figure 11:
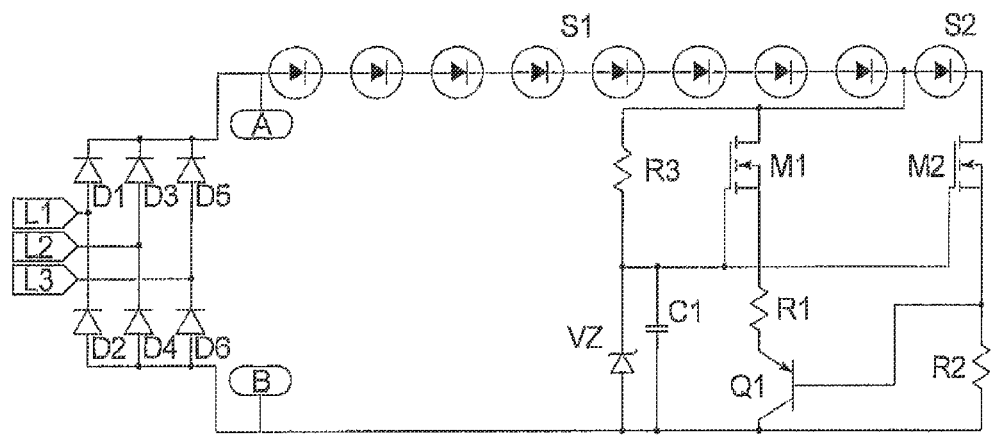
FIG. 11 is a schematic circuit diagram of a further embodiment of the invention, with level dimming.
Figure 12:
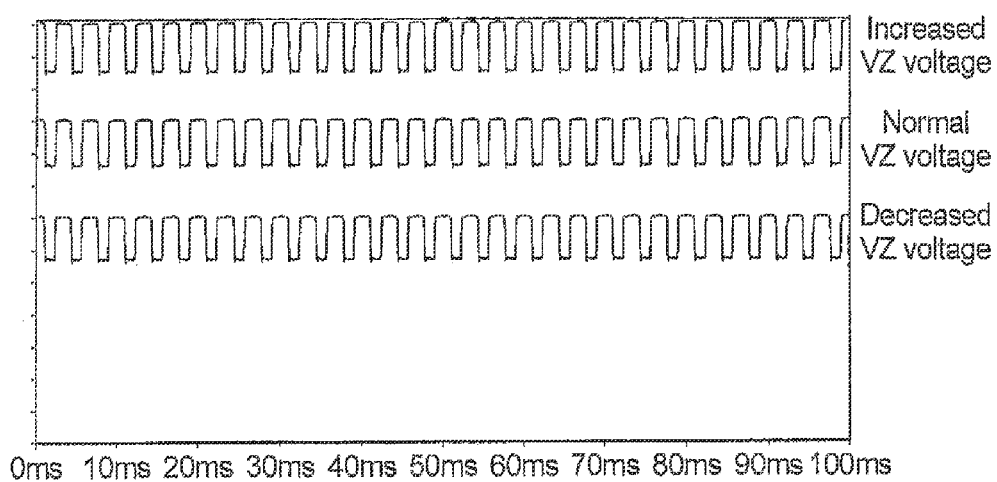
FIG. 12 shows light output waveforms for different voltages of the variable voltage source in the embodiment of FIG. 11.

FIG. 11 shows a modified circuit for level dimming. Zener diode ZD1 is replaced by a controllable voltage source to VZ. The LED current is proportional to the voltage of VZ. FIG. 12 shows the effect of increasing or decreasing the voltage of VZ. This level dimming feature makes the circuit adaptable to conventional 0-10V lighting dimming.

Figure 13:
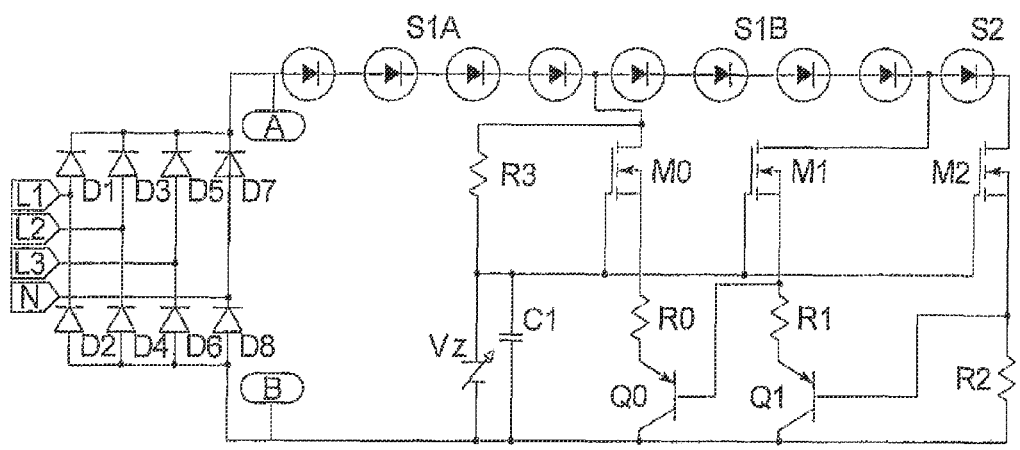
FIG. 13 is schematic circuit diagram of a further embodiment of the invention allowing operation either in a three-phase mode or in a single-phase mode.
Figure 14:
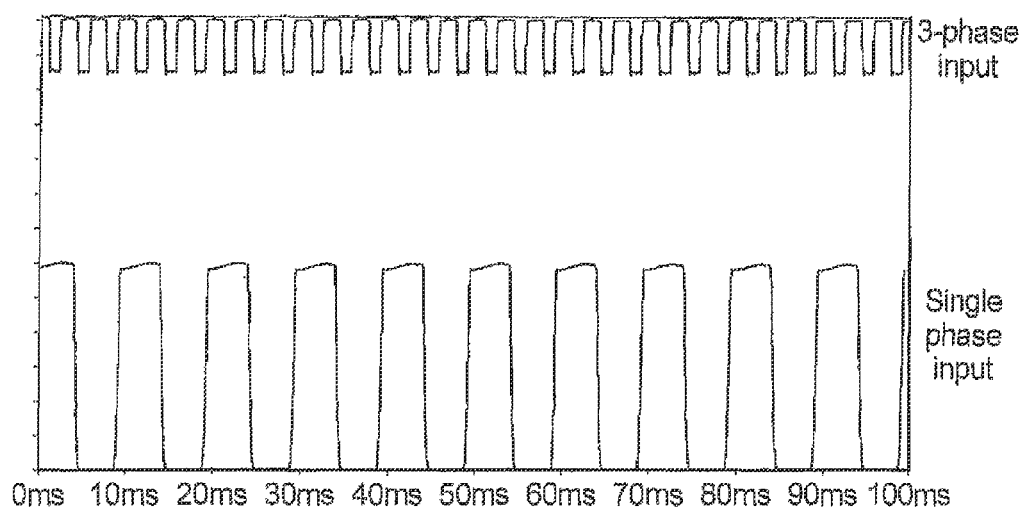
FIG. 14 shows the light output waveforms for the three-phase mode and the single phase mode, respectively, for the embodiment of FIG. 13.

FIG. 13 shows a circuit is operable with both 3-phase input and single phase input. In this case, the neutral input is required to be connected to the circuit. LED string S1 is further divided into substrings S1A and S1B. An additional current source formed by transistor M0, the resistor R0, and a bipolar transistor Q0 is used to drive the LED string S1A. With 3-phase input, this additional current source never conducts and the circuit operates as described for the circuit in FIG. 5. With only single phase input, e.g. phases L2 and L3 are disconnected, S1A is conducting when the rectified voltage is above 200V. Since the peak input voltage of a single phase is not high enough to make LED strings S1B and S2 conduct, only LED string S1A will be illuminated all the time. FIG. 14 shows the light waveforms of 3-phase input and single phase input. It should be noted that during single phase input, the light output is reduced and the ripple frequency is lowered with LED off-time. Normally, the circuit should operate in 3-phase input mode. The single phase operation is only for power fault conditions when 3-phase power is not available.

Although the embodiment shown in FIG. 13 makes use of a variable voltage source VZ for level dimming in accordance with the embodiment of FIG. 11, the circuit shown in FIG. 13 can also be designed with constant current sources, as in the embodiment of FIG. 5, by replacing the variable voltage source VZ with the Zener diode ZD1.

Figure 15:
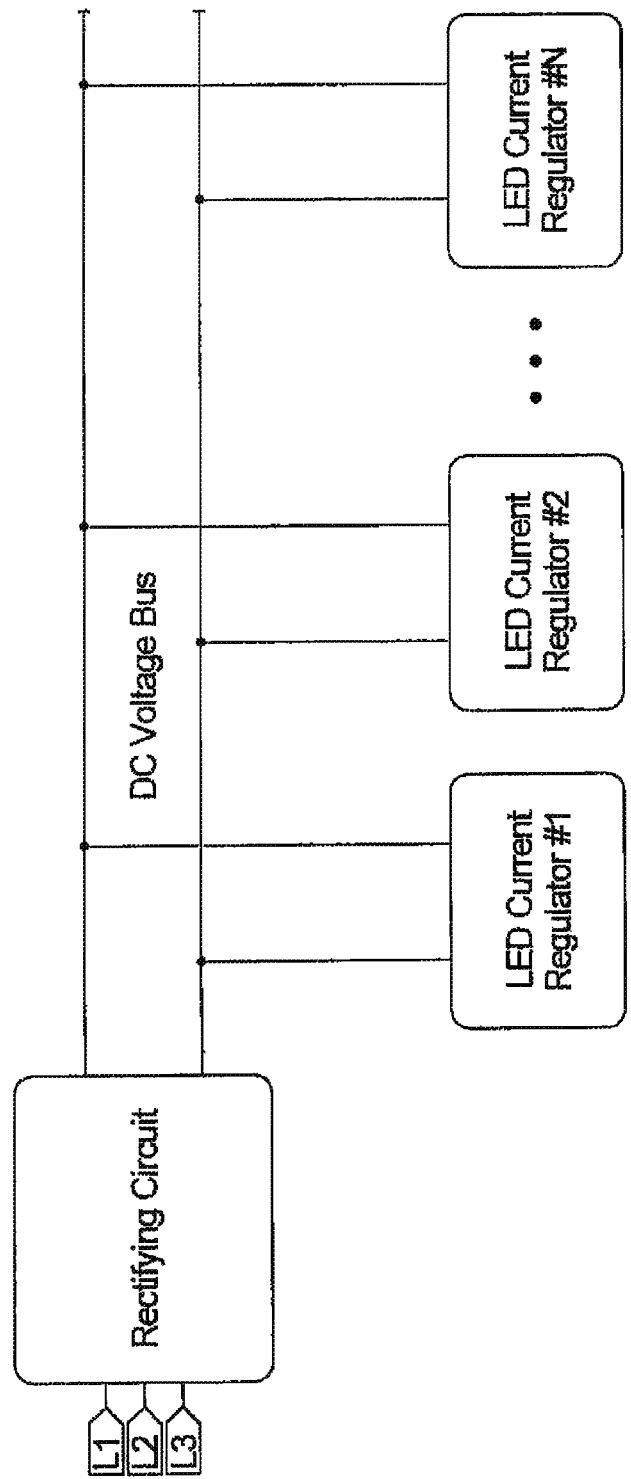
FIG. 15 is a block diagram of a power distribution system in accordance with the invention, using a single phase transmission network.

As shown in FIG. 5, the front and of the circuit shown therein, namely the rectifying circuit, can be physically separated from the LED current circuit, as indicated by the dashed lines in FIG. 5. As shown in FIG. 15, those circuit portions can be physically separated from each other by a two-wire, single-phase transmission system.

By situating the rectifying circuit at the front-end of the overall system, such as at a power station that provides power to miles of road lamps, the three-phase power is converted into DC ripple power, which is distributed to the LEDs, such as road lamps, at the respective sites to be illuminated. Therefore, the LED circuitry at those sites need only contain the portion designated as LED current circuit in FIG. 5.

The advantage of converting the three-phase power at the front end of the transmission system is that the aforementioned DC ripple power requires only two wires for power distribution, so that existing power supply cables can be used for providing power to the actual sites of the LEDs. There is thus no need to change from the existing or standard two-wire, single phase cable system to a three-wire or four-wire system, in order to make use of the three-phase power source as described herein.

Moreover, the total cost of the overall system is reduced, because each LED does not require its own on-site rectifier circuit.

Although modifications and changes may be suggested by those skilled in the art, it is the intention of the inventor to embody within the patent warranted hereon all changes and modifications as reasonably and properly come within the scope of his contribution to the art.

What is claimed is:

1. Light emitting diode (LED) drive circuitry, comprising:
   a rectifier comprising three inputs adapted for connection to a three-phase power source to respectively receive three-phase currents from said three-phase power source;
   said rectifier comprising a plurality of diodes connected to rectify said three-phase currents to produce a DC voltage across two outputs of said rectifier;
   a single phase power transmission system including two wires, respectively connected to said two outputs of said rectifier;
   a plurality of LEDs connected in series across said two wires at at least one location situated remote from said rectifier, and driven by said DC voltage produced by said rectifier at said two outputs, and being physically separated from said rectifier by said transmission system at said at least one location remote from said rectifier; and
   first and second current sources connected to the plurality of LEDs and across said two wires, the first current source being configured to drive a first LED of the plurality of LEDs based on said DC voltage, and the second current source being configured to drive the first LED and a second LED of the plurality of LEDs based on said DC voltage, wherein the first current source comprises: a field-effect transistor (FET), a resistor, and a bi-polar junction transistor (BJT), wherein the drain of the FET is connected to a first of the two outputs of said rectifier, the source of the FET is connected to the emitter of the BJT via the resistor, and the collector of the BJT is connected to a second of the two outputs of said rectifier.

2. The LED drive circuitry as claimed in claim 1, wherein said plurality of LEDs are divided into a plurality of sets of LEDs, with each set of LEDs comprising a plurality of LEDs connected in series, and wherein each set of LEDs is individually connected across said two wires, at respective different, separated remote locations from said rectifier.

3. The LED drive circuitry as claimed in claim 1, wherein the second current source comprises: a second field-effect transistor (FET) connected in series with a second resistor, wherein the drain of the second FET is connected to the first of the two outputs of said rectifier, the source of the second FET is connected to the base of the BJT and to the second of the two outputs of said rectifier via the second resistor.

4. The LED drive circuitry as claimed in claim 3, further comprising a voltage source configured to bias the respective gates of the FET and the second FET.

5. The LED drive circuitry as claimed in claim 4, wherein the voltage source comprises: a resistor connected in series to a Zener diode and a capacitor connected in parallel.

6. The LED drive circuitry as claimed in claim 4, wherein the voltage source comprises: a resistor connected in series to a controllable voltage source and a capacitor connected in parallel.

7. The LED drive circuitry as claimed in claim 1, wherein the first current source is configured to drive the first LED if said DC voltage is less than a voltage threshold and the second current source is configured to drive the first LED and the second LED if said DC voltage is greater than said voltage threshold.

8. The LED drive circuitry as claimed in claim 7, wherein the first current source does not conduct when the second current source drives the first LED and the second LED.

9. The LED drive circuitry as claimed in claim 8, wherein the second current source does not conduct when said DC voltage is less than the voltage threshold.

10. The LED drive circuitry as claimed in claim 1, wherein the first current source does not conduct when the second current source drives the first LED and the second LED.

11. The LED drive circuitry as claimed in claim 10, wherein the second current source does not conduct when said DC voltage is less than the voltage threshold.

12. The LED drive circuitry as claimed in claim 1, wherein the first current source and the second current source are connected in parallel between the two outputs of said rectifier.

13. The LED drive circuitry as claimed in claim 1, wherein the base of the BJT is connected to the second current source and is configured to turn off the first current source when the second current source drives the first LED and a second LED of the plurality of LEDs.

14. A method for driving light emitting diodes (LEDs), comprising:
   connecting three inputs of a rectifier to a three-phase power source to respectively receive three-phase currents at said three inputs from said three-phase power source;
   in said rectifier, rectifying said three-phase currents to produce a DC voltage across two outputs of said rectifier;
   connecting a single-phase power transmission system, including two wires, to said two outputs of said rectifier;
   connecting a plurality of LEDs in series across said two wires of said single-phase power transmission system at at least one location that is remote from said rectifier, and driving said LEDS at said at least one location with said DC voltage produced by said rectifier, with said LEDs being physically separated from said rectifier by said single phase power transmission system;
   driving, using a first current source, a first LED of the plurality of LEDs based on said DC voltage, wherein the first current source comprises: a field-effect transistor (FET), a resistor, and a bi-polar junction transistor (BJT), wherein the drain of the FET is connected to a first of the two outputs of said rectifier, the source of the FET is connected to the emitter of the BJT via the resistor, and the collector of the BJT is connected to a second of the two outputs of said rectifier; and
   driving, using a second current source, the first LED and a second LED of the plurality of LEDs based on said DC voltage, the first and the second current sources being connected to the plurality of LEDs and across said two wires.

15. The method of driving LEDs as claimed in claim 14, comprising dividing said plurality of LEDs into a plurality of sets of LEDs, with each set of LEDs comprising LEDs connected in series with each other, and individually connecting said sets of LEDs at respective locations across said two wires that are differently remotely situated from said rectifier.

* * * * *